March 22, 1927. 1,622,081
J. E. BLINCOW
COOKING APPARATUS
Filed Feb. 11, 1926

Inventor:-
Joseph Edward Blincow
By Sturtevant & Chisom
Attorneys

Patented Mar. 22, 1927.

1,622,081

UNITED STATES PATENT OFFICE.

JOSEPH EDWARD BLINCOW, OF WOLVERHAMPTON, ENGLAND.

COOKING APPARATUS.

Application filed February 11, 1926, Serial No. 87,624, and in Great Britain February 13, 1925.

The present invention relates to improved cooking apparatus particularly to vessels in which hams, meats or the like are to be cooked.

A method in cooking hams, meat or the like is to insert a ham or the like in a vessel between a pair of plates or false bottoms, close the vessel, and insert it with one or a number of other similar vessels in a steam chamber or a chamber containing boiling water.

According to the present invention a wedge-shaped member is adapted to divide the cooking vessel into a pair of compartments so that more than one ham may be cooked during the given time in each vessel.

The wedge-shaped member may be resiliently mounted at one end on a pair of diaphragms or plates, to take up a position longitudinally of the vessel while the diaphragm or plates are adapted to retain the hams in this position.

The wedge-shaped member may have any suitable contour in horizontal cross section. In a plan view the cooking vessel is of any suitable shape, for example, rectangular, square, circular or elliptical. In a cooking vessel of circular or elliptical horizontal cross section, by providing a wedge-shaped member of rectangular cross section a ham after compression and cooking in the vessel would assume a D shape in cross section. Further, if a double concave horizontal cross sectional shaped wedge is used with a circular or elliptical vessel the resultant cooked ham would have an elliptical or circular horizontal cross section, while if such a wedge is used with a rectangular cross sectional shaped vessel the hams or meat after compression would assume a D shape in cross section.

The invention is more particularly described with reference to the accompanying drawings, in which.

Figure 1:
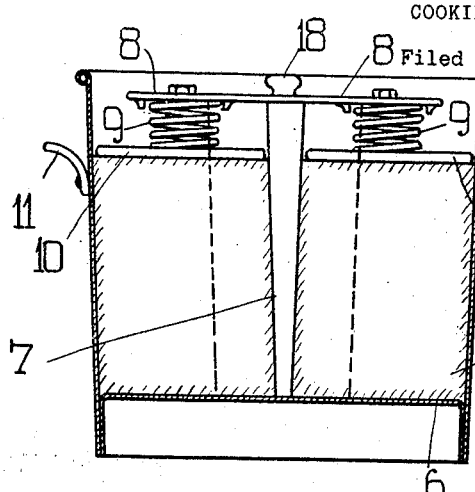
Figure 1 is a cross sectional view in elevation of one form of container with the wedge of the present invention and spring means for retaining the hams, meat or the like in position in the container.
Figure 2:
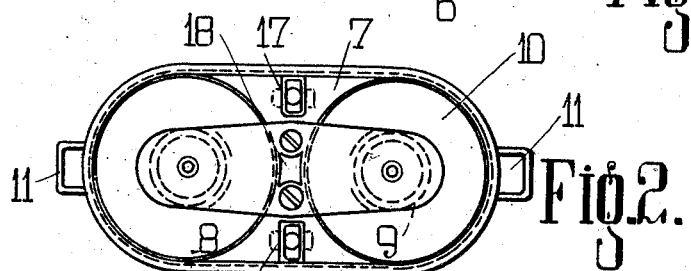
Figure 2 is a plan view.

As is shown in Figs. 1 and 2, a cylindrical vessel 5 the walls of which are semi-circular at their ends is provided with a raised base 6. A wedge 7 of any suitable cross section either rectangular, plano-concave or double concave, is adapted to be inserted longitudinally in the vessel or container 5 after a pair of hams or the like have been inserted, such wedge separating the hams.

The horizontal cross sectional area of the cooking vessel 5 is greater at the top of the vessel than at its base 6 by an amount equal to the difference between the horizontal cross sectional area of the ends of the wedge 7, that is to say, the taper of the wedge is equal to the taper of the walls of the cooking vessel. Mounted on the head of the wedge 7 is an arm or cross bar 8 of any suitable dimensions and width, which cross bar is adapted at its outer ends to receive spiral springs 9 fitted to diaphragms or cover plates 10. When the wedge is in position these diaphragms or cover plates 10 retain the hams or meat within their respective compartments. Such a construction eliminates the necessity of the use of a lid for the vessel, although such a lid may be used, if desired.

The container or vessel 5 is provided with handles 11 for the ready transportation of the vessel when desired, while clips 17 may be used to securely attach the wedge 7 to the walls of the vessel 5, the clips being shewn in dotted lines in Fig. 2 when in their inoperative position and in full lines when engaging with a rim on the wall of the container 5. Alternatively these clips may be eliminated and the wedge-shaped member 7 loosely held in the vessel. The provision of the springs 9 is also a preferred form of construction and if desired these springs may be eliminated and the wedge 7 connected directly by the bar 8 to the cover plate or diaphragm 10.

The wedge 7 is provided with a handle 18, for the purpose of readily removing the wedge from the container after cooking has been completed.

Both the cooking vessel 5 and the wedge 7 may be made of any suitable material such as aluminum or the like metal, wood bound with metal, enamelled steel or earthenware.

In a modified form of construction a vessel 12 has similar tapering features and a false base 6. In this case the vessel is of horizontal rectangular cross section and is provided with the wedge 7 for shaping and separating the hams as formerly described. A modified form of retaining the hams in position within the containers is shown, this construction embodying the use of weights 13 provided with handles 14, the weights being of a shape suitable to the particular container with which they are used. A lid 15 provided with a handle 16 may be used if desired although this is not necessary. Clips 17 are mounted on the top of the wedge and when this is in position the clips are adapted to engage beneath a rim on the cooking vessel. In order to withdraw the wedge from the cooking vessel the clips are rotated through 90°, i. e. to a position shown in dotted lines in the drawings.

The advantages of the wedge-shaped member, besides that of shaping the hams to be cooked, reside in that the hams are readily removed from the vessel after cooking, once the wedge has been removed and a space left in the vessel caused by such removal of the wedge. Previously in the case of containers or vessels for cooking hams, it has been necessary due to the suction effect of the fluid within the vessel to provide a plug in the base of the vessel to allow for the withdrawal of the fluid after cooking and prior to the removal of the ham, meat or the like.

The wedge eliminates the use of such a plug as it can itself be readily removed on account of its tapered body, and a space is left by such removal to manipulate the hams so that these may be easily removed.

Figure 5:
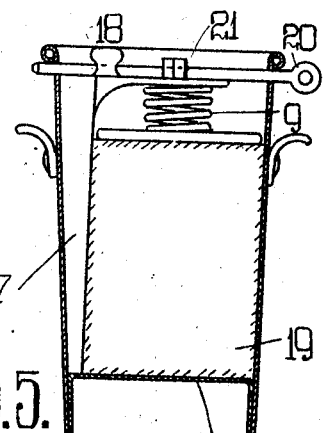
Figure 5 is a view in elevation of a sectional container for cooking a single ham, shewing the wedge at one side.
Figure 6:
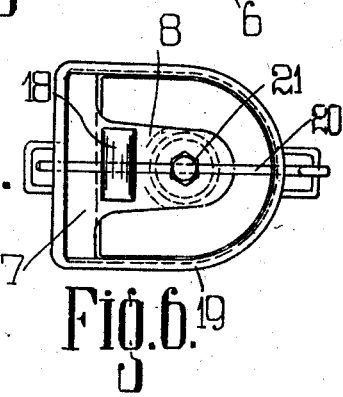
Figure 6 is a plan view of such a container.
Figure 3:
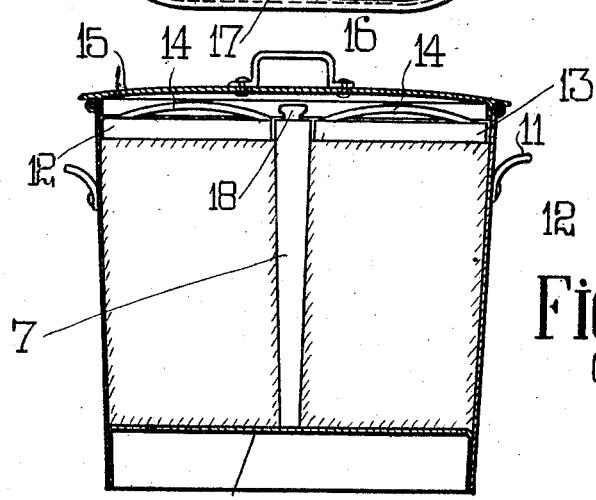
Figure 3 is a sectional view in elevation of a modified form of container together with a modified form of securing means for the hams, meat or the like within the container, i. e. gravity retaining means in place of the spring means of Fig. 1.
Figure 4:
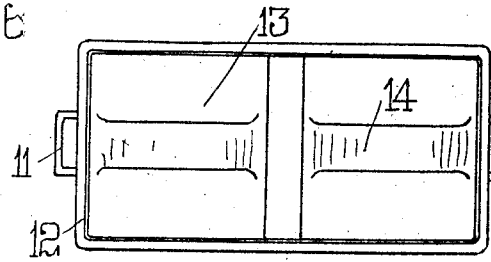
Figure 4 is a corresponding plan view.

In a modified form of construction as shewn in Figs. 5 and 6 a container 19 may be adapted to hold a single ham for example one which it is desired to eventually assume a D shape. In such a case the wedge 7 contacts with one wall of the container 19 and is provided with one spring 9 only.

Pins 20 may be provided to retain the wedge within the container during cooking, such pins being passed through slots in the wall of the container and through a slot 21 formed in a lug on the arm or cross bar 8. This form of attachment of the wedge to the container may be substituted for the clips 17 in the containers shewn in Figs. 1 to 4.

I declare that what I claim is:—

1. A cooking vessel for meats comprising an open-mouthed container, a wedge shaped separating element within said container and a cover plate mounted on said wedge shaped element.

2. A cooking vessel for meats comprising an open-mouthed container, a wedge shaped separating element within said container and a cover plate spring mounted on said wedge shaped element.

3. A cooking vessel for meats comprising an open-mouthed container, a wedge shaped separating element adapted to be inserted therein, and readily removed therefrom, and means to lock said wedge shaped element against axial displacement.

In witness whereof, I have hereunto signed my name this 28th day of January, 1926.

JOSEPH EDWARD BLINCOW.